C. H. LIGHT.
AIRLESS TIRE.
APPLICATION FILED JUNE 8, 1920.
1,388,350.
Patented Aug. 23, 1921.
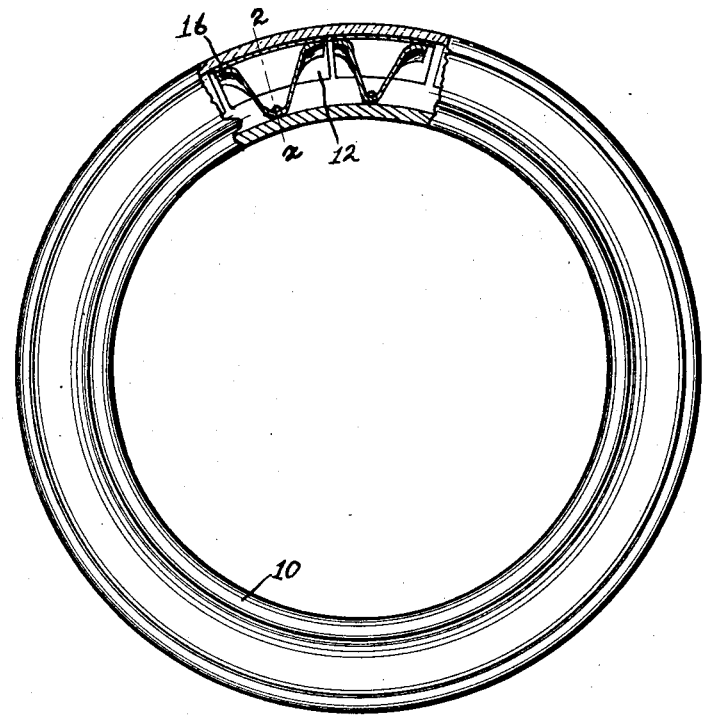
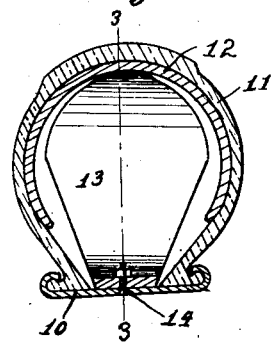
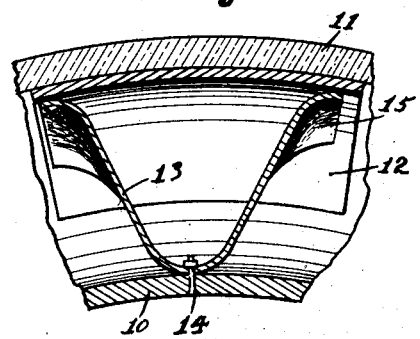
Witness.
Roy Kison.
Inventor.
Claus H. Light.
By Orwig + Bair Attorneys.

UNITED STATES PATENT OFFICE.

CLAUS H. LIGHT, OF DES MOINES, IOWA, ASSIGNOR OF ONE-EIGHTH TO AUGUST MAY AND ONE-EIGHTH TO VICTORENE L. STAMEN, BOTH OF DES MOINES, IOWA.

AIRLESS TIRE.

1,388,350.  Specification of Letters Patent.  Patented Aug. 23, 1921.

Application filed June 8, 1920. Serial No. 387,450.

*To all whom it may concern:*

Be it known that I, CLAUS H. LIGHT, a citizen of the United States, and resident of Des Moines, in the county of Polk and State of Iowa, have invented a certain new and useful Airless Tire, of which the following is a specification.

The object of my invention is to provide an airless tire of the type using resilient springs arranged between the rim and the spaced outer members in novel manner, said spring being increased in a tire casing substantially of the type ordinarily used with pneumatic tires.

With this and other objects in view, my invention consists in the construction arrangement and combination of the various parts of the device, whereby the objects contemplated are attained, as hereinafter more fully set forth, pointed out in my claim, and illustrated in the accompanying drawings, in which:

Figure 1 shows a side elevation of an airless tire embodying my invention, parts being broken away and parts being shown in section.

Fig. 2 shows a detail sectional view taken on the line 2—2 of Fig. 1; and

Fig. 3 shows a detail sectional view taken on the line 3—3 of Fig. 2.

In the accompanying drawings I have used the reference numeral 10 to indicate generally a rim which may be of the demountable type used on automobile wheels. Mounted on the rim 10 is an ordinary pneumatic tire casing 11. Received within the tire casing 11 is a series of members 12, arranged in a series circumferentially around the tire and spaced slightly from each other. The members 12 have the form of inwardly opening channels, and are shaped to conform to the interior of the tire.

Connected with the rim 10, midway between the ends of each member 12, is a spring 13 which is secured by a bolt 14 or other suitable means at its central portion to the rim 10, and which has parts extending away from the rim 10 and diverging circumferentially of the tire, as illustrated in Figs. 1 and 3. The springs 13, at their points where they are engaged by the bolts 14 and for a substantial distance spaced from the bolts 14 on each side thereof, are practically flat.

The outer ends of the springs 13 are curved to form inwardly opening channels to fit the inner surfaces of the members 12, forming portions 15.

One portion 15 of each spring is secured by a rivet or the like 16 to the member 12, and the other portion 15 is arranged to engage and slide freely on the member 12.

It will be seen that the springs and the members 12 are held against creeping circumferentially of the tire by means of the bolts 14 and 16, and that some slight play may be allowed between the successive members 12.

It will also be noted that the outer surfaces of the members 12 conform to the shape of the interior of the casing 11, so that the wear on the interior of the casing 11 is reduced to a minimum. In carrying a load the springs will support the load with a yielding movement. The portions of each spring between the bolt 14 and the bolt 16 will bend and yield resiliently, and the opposite end of each spring may slide on the member 12. Said opposite end is preferably made quite stiff, so as to take the first road shock and vibration.

Some changes may be made in the construction and arrangement of the parts of my improved airless tire without departing from the real spirit and purpose of my invention, and it is my intention to cover by my claim and modified forms of structure or use of mechanical equivalents which may be reasonably included within its scope.

I claim as my invention:

An airless tire structure, comprising the combination of a vehicle wheel rim with a flexible resilient casing mounted thereon, a plurality of inwardly opening channel-shaped non-fabric members received in the interior of the tread portion of said casing spaced from said rim arranged in a series circumferentially of the structure and a resilient device arranged in the casing opposite each of said channel-shaped members, and comprising a substantially V-shaped spring fixed at its apex to the rim and having its ends bearing against one of said members and curved to fit against such member, one of said ends being fixed to such member and the other being adapted to slide thereon; each of said resilient members being flat from side to side at its central part, and having its ends channel-shaped to fit the channel shaped members.

Des Moines, Iowa, May 14, 1920.

CLAUS H. LIGHT.